US010333786B2

(12) United States Patent
Ponnusamy et al.

(10) Patent No.: US 10,333,786 B2
(45) Date of Patent: Jun. 25, 2019

(54) SYSTEM AND METHOD FOR REFRESHING AN INFORMATION HANDLING SYSTEM USING MANY TO ONE PEER BASED COMMUNICATION

(71) Applicant: Dell Products L.P., Round Rock, TX (US)

(72) Inventors: Vigneswaran Ponnusamy, Round Rock, TX (US); Sundar Dasar, Round Rock, TX (US); Cyril Jose, Austin, TX (US); Yogesh P. Kulkarni, Round Rock, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 206 days.

(21) Appl. No.: 15/211,381

(22) Filed: Jul. 15, 2016

(65) Prior Publication Data

US 2018/0019919 A1    Jan. 18, 2018

(51) Int. Cl.
*H04L 12/24*    (2006.01)

(52) U.S. Cl.
CPC ........ *H04L 41/0846* (2013.01); *H04L 41/082* (2013.01); *H04L 41/0873* (2013.01); *H04L 41/0893* (2013.01)

(58) Field of Classification Search
CPC ..................... H04L 41/082; H04L 41/9886
See application file for complete search history.

(56) References Cited

U.S. PATENT DOCUMENTS

| 6,167,512 | A  | * | 12/2000 | Tran ................... G06F 11/2289 710/262 |
| 6,176,511 | B1 | * | 1/2001  | Adkisson ............ B60R 21/2171 280/728.2 |
| 7,007,160 | B1 | * | 2/2006  | Makphaibulchoke ...................... G06F 9/4411 713/1 |
| 7,430,747 | B2 | * | 9/2008  | Manion ................. H04L 67/104 709/223 |
| 7,502,803 | B2 | * | 3/2009  | Culter ................... G06F 9/4411 |
| 9,269,081 | B1 | * | 2/2016  | Panzer .................. G06Q 50/01 |
| 2002/0059473 | A1 | * | 5/2002 | Oshins .................. G06F 9/4411 719/321 |
| 2002/0091807 | A1 | * | 7/2002 | Goodman ................ G06F 8/65 709/221 |
| 2002/0133487 | A1 | * | 9/2002 | Oshins .................. G06F 9/4411 |
| 2002/0156875 | A1 | * | 10/2002 | Pabla ........................ H04L 1/24 709/220 |
| 2003/0135785 | A1 | * | 7/2003 | Carr ...................... G06F 9/4406 714/25 |
| 2003/0236970 | A1 | * | 12/2003 | Palmer ..................... G06F 8/65 713/1 |

(Continued)

*Primary Examiner* — Jimmy H Tran
(74) *Attorney, Agent, or Firm* — Baker Botts L.L.P.

(57) ABSTRACT

Methods and systems for refreshing an information handling system may include receiving a request for information, searching a group inventory for the information, and responding to the request with the information. The information may correspond to a configuration. The request may be received from a node in a group with a plurality of nodes. The information requested may correspond to an update to the configuration of the node. The group inventory may be sourced from the group. The information in the response may be based on finding a match in the group inventory.

20 Claims, 4 Drawing Sheets

(56) References Cited

U.S. PATENT DOCUMENTS

| | | | |
|---|---|---|---|
| 2006/0248282 A1* | 11/2006 | Rostampour | G06F 9/45537 711/141 |
| 2007/0162776 A1* | 7/2007 | Carpenter | G06F 1/3203 713/320 |
| 2007/0294575 A1* | 12/2007 | Aichelen | G06F 11/1461 714/13 |
| 2008/0028385 A1* | 1/2008 | Brown | G06F 8/65 717/170 |
| 2008/0072028 A1* | 3/2008 | Allison | G06F 9/4418 713/1 |
| 2008/0130639 A1* | 6/2008 | Costa-Requena | G06F 8/65 370/389 |
| 2008/0235333 A1* | 9/2008 | Miller | G06F 9/5061 709/204 |
| 2008/0250407 A1* | 10/2008 | Dadhia | G06F 9/45533 718/1 |
| 2009/0138865 A1* | 5/2009 | Furbee | G06F 8/656 717/168 |
| 2011/0072423 A1* | 3/2011 | Fukata | G06F 8/65 717/172 |
| 2011/0106886 A1* | 5/2011 | Nolterieke | G06F 8/65 709/204 |
| 2011/0173428 A1* | 7/2011 | Goettel | G06F 9/4403 713/2 |
| 2011/0276794 A1* | 11/2011 | Yamaguchi | G06F 9/4413 713/1 |
| 2012/0278386 A1* | 11/2012 | Losacco | H04L 67/1078 709/204 |
| 2013/0166893 A1* | 6/2013 | Dusija | G06F 8/654 713/2 |
| 2013/0318336 A1* | 11/2013 | Yu | G06F 9/4406 713/2 |
| 2014/0089551 A1* | 3/2014 | Estrada | G06F 13/4027 710/312 |
| 2014/0297999 A1* | 10/2014 | Kim | G06F 9/4401 713/1 |
| 2014/0337344 A1* | 11/2014 | Wu | G06K 9/00677 707/738 |
| 2015/0100801 A1* | 4/2015 | Maity | G06F 1/3206 713/320 |
| 2015/0127817 A1* | 5/2015 | Paek | H04L 43/028 709/224 |
| 2015/0160960 A1* | 6/2015 | Delco | G06F 9/45545 718/1 |
| 2015/0346753 A1* | 12/2015 | Gan | G06Q 50/06 700/295 |
| 2016/0048389 A1* | 2/2016 | Paulraj | G06F 8/654 717/170 |
| 2016/0055225 A1* | 2/2016 | Xu | G06F 16/27 707/624 |
| 2016/0196131 A1* | 7/2016 | Searle | H04L 41/082 717/173 |
| 2016/0306649 A1* | 10/2016 | Gunti | G06F 9/45558 |
| 2017/0085447 A1* | 3/2017 | Chen | G06F 16/248 |
| 2017/0085691 A1* | 3/2017 | Kim | H04M 1/274508 |
| 2017/0102962 A1* | 4/2017 | Cismas | G06F 9/46 |
| 2017/0116095 A1* | 4/2017 | Schatz | G06F 11/2033 |
| 2017/0272928 A1* | 9/2017 | Jeng | H04W 8/005 |
| 2018/0314726 A1* | 11/2018 | Bath | G06F 16/2365 |

\* cited by examiner

SYSTEM AND METHOD FOR REFRESHING AN INFORMATION HANDLING SYSTEM USING MANY TO ONE PEER BASED COMMUNICATION

BACKGROUND

Field of the Disclosure

This disclosure relates generally to information handling systems and more particularly to systems and methods for refreshing an information handling system using many to one peer based communication.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of management controllers in information handling systems has increased in recent years. Broadly speaking, a management controller may be a device, system, or apparatus for remote monitoring or management of an information handling system. A management controller may be enabled to use a so-called 'out-of-band' network interface that is physically isolated from an 'in-band' network interface used generally for non-management communications. The management controller may include, or be an integral part of, a baseboard management controller (BMC), a Dell Remote Access Controller (DRAC), or an Integrated Dell Remote Access Controller (iDRAC). The management controller may be a secondary information handling system embedded in the information handling system.

SUMMARY

A group of management controllers may be communicatively coupled to provide a group refresh, which may be achieved using a group manager. A refresh may include updating, configuring, recovering, and/or deploying an information handling system, in part or whole. For example, a refresh of an information handling system may be related to the replacement of an expired information handling system component with a new information handling system component. As another example, a refresh of an information handling system in the form of a server may be related to the replacement of an expired server with a new server, which may have a new generation of capabilities in comparison to the expired server.

A user performing a refresh of an information handling system may not have all of the configuration details for the system, including but not limited to firmware, drivers, and configuration settings. The information handling system under refresh, however, may be similar to other information handling systems, which may be grouped together. Thus, it may be desirable to provide configuration details from similar configurations to assist the user in configuration. Such a refresh, also referred to as a group refresh, may be managed by a group manager and may prevent incorrect configurations, such as legacy versions of drivers, from being used to configure the information handling system. Moreover, such a refresh may performed more quickly than a manual refresh, which may enable an information handling system to remain online and/or operational for more time. Group refresh may also enable reduced resource usage by minimizing duplication of configuration files across management controllers and/or an information handling system or plurality of information handling systems.

In one aspect, a disclosed method for refreshing an information handling system comprises receiving a request for information, searching a group inventory for the information, and responding to the request with the information. The information requested may correspond to a configuration. The request may be received from a node in a group with a plurality of nodes. The information requested may correspond to an update to the configuration of the node. The group inventory may be sourced from the group. The information in the response may be based on finding a matching in the group inventory. The information requested may comprise at least one of a firmware, a driver, and a configuration setting. The information in the response may be a link to a file.

In certain embodiments, the method may include searching the group inventory for at least one of a Peripheral Component Interconnect Express (PCI-E) identifier sourced from the request and a reseller component identifier sourced from the request. The method may include modifying the information based on a policy, wherein the policy specifies a particular version of the configuration and replaces a version in the request with the particular version specified by the policy. The method may include determining that no match was found during the search, distributing a request to the group to locate the information requested, receiving a response to the request with the information corresponding to the configuration, and inserting the information received into the group inventory. The match found in the group inventory may correspond to the information received. The group inventory may be sorted to enable a match for the latest or most recently released version of the configuration.

Another disclosed aspect includes an information handling system, comprising a processor subsystem having access to a first memory, and a management controller comprising a secondary processor having access to a second memory, the second memory including an embedded storage partition and the second memory storing instructions executable by the secondary processor.

A further disclosed aspect includes a management controller for an information handling system having a primary processor and a primary memory, the management controller comprising a secondary processor having access to a second memory, the second memory including an embedded storage partition and the second memory storing instructions executable by the secondary processor.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
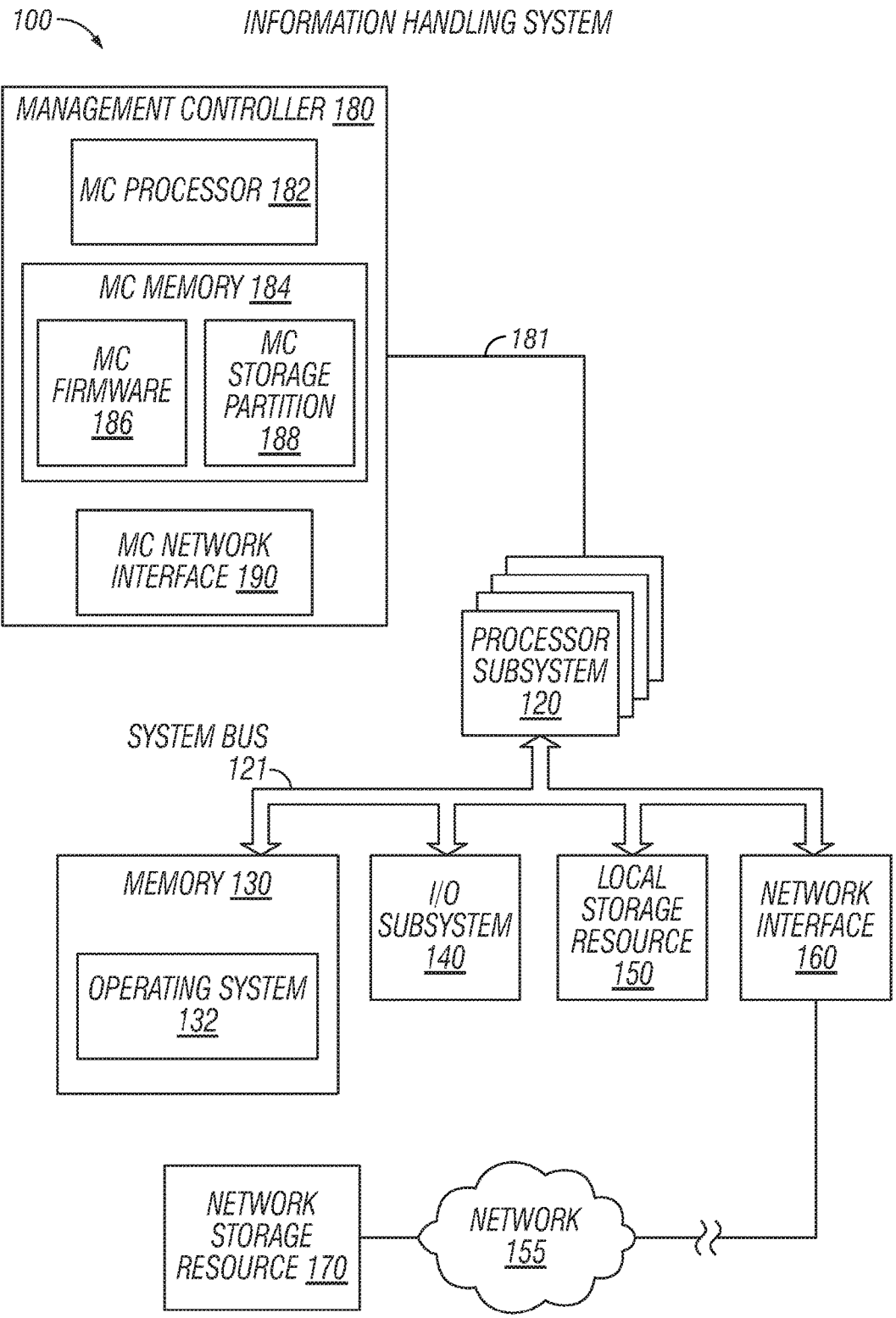
FIG. 1 is a block diagram of selected elements of an information handling system for refresh using many to one communication, in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an embodiment of information handling system 100 for managing distributed group identity. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is management controller (MC) 180, which may include MC processor 182 as a second processor included with information handling system 100 for certain management tasks. MC 180 may interface with processor subsystem 120 using any suitable communication link 181 including, but not limited to, a direct interface with a platform controller hub, a system bus, and a network interface. The system bus may be system bus 121, which may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. The network interface may be network interface 160 and/or network interface 190. The platform controller hub may provide additional functionality for the processor subsystem 120. The platform controller hub may be internal or external to a processor in processor subsystem 120. The direct interface may be any suitable interface to enable communications, including but not limited to Direct Media Interface (DMI) or PCI-Express.

MC processor 182 may have access to MC memory 184, which may store MC firmware 186, representing instructions executable by MC processor 182. Also shown stored in MC memory 184 is MC storage partition 188, which may represent an embedded storage partition for management controller 180. MC firmware 186 may represent pre-boot instructions executable by MC processor 182, for example, for preparing information handling system 100 to boot by activating various hardware components in preparation of launching operating system 132 for execution (also referred to as a basic input/output system (BIOS)). In certain embodiments, MC firmware 186 includes a Unified Extensible Firmware Interface (UEFI) according to a specification promulgated by the UEFI Forum (uefi.org). Also included with management controller 180 is MC network interface 190, which may be a secondary network interface to network interface 160. MC network interface 190 may provide "out-of-band" network access to management controller 180, for example, even when network interface 160 is unavailable. Thus, management controller 180 may execute MC firmware 186 on MC processor 182 and use MC network interface 190 even when other components in information handling system 100 are inoperable. It is noted that, in certain embodiments, management controller 180 may represent an instance of iDRAC while MC firmware 186 may include a lifecycle controller, which may assist in a variety of functions including, but not limited to, monitoring, updating, maintaining, testing, and deploying one or more components for an information handling system.

Management controller 180 may communicate with other management controllers using MC network interface 190. A set of management controllers in communication may form a group, in which each management controller or each information handling system with a management controller may be a node. One of the management controllers in the group may operate as a group manager. A group manager may facilitate the refresh of an information handling system by communicating with the management controllers in the group to locate and identify configuration information. The refresh may use many to one peer-based communication, in which many nodes may communicate with the node under refresh. A refresh may include any suitable action to change the configuration of an information handling system, including but not limited to the firmware, drivers, and/or configuration files. In one embodiment, a refresh may be an update to an existing information handling system. In another embodiment, a refresh may be a configuration change to an existing information handling system. In a further embodiment, a refresh may be the recovery of an existing information handling system. In yet another embodiment, a refresh may enable the deployment of a new information handling system, which may replace a previous information handling system. The configuration information may be located using many to one peer-based communication. Once located, the information may be collected by the group manager, which may arbitrate between different versions and configurations by using a best match identification.

Figure 2:
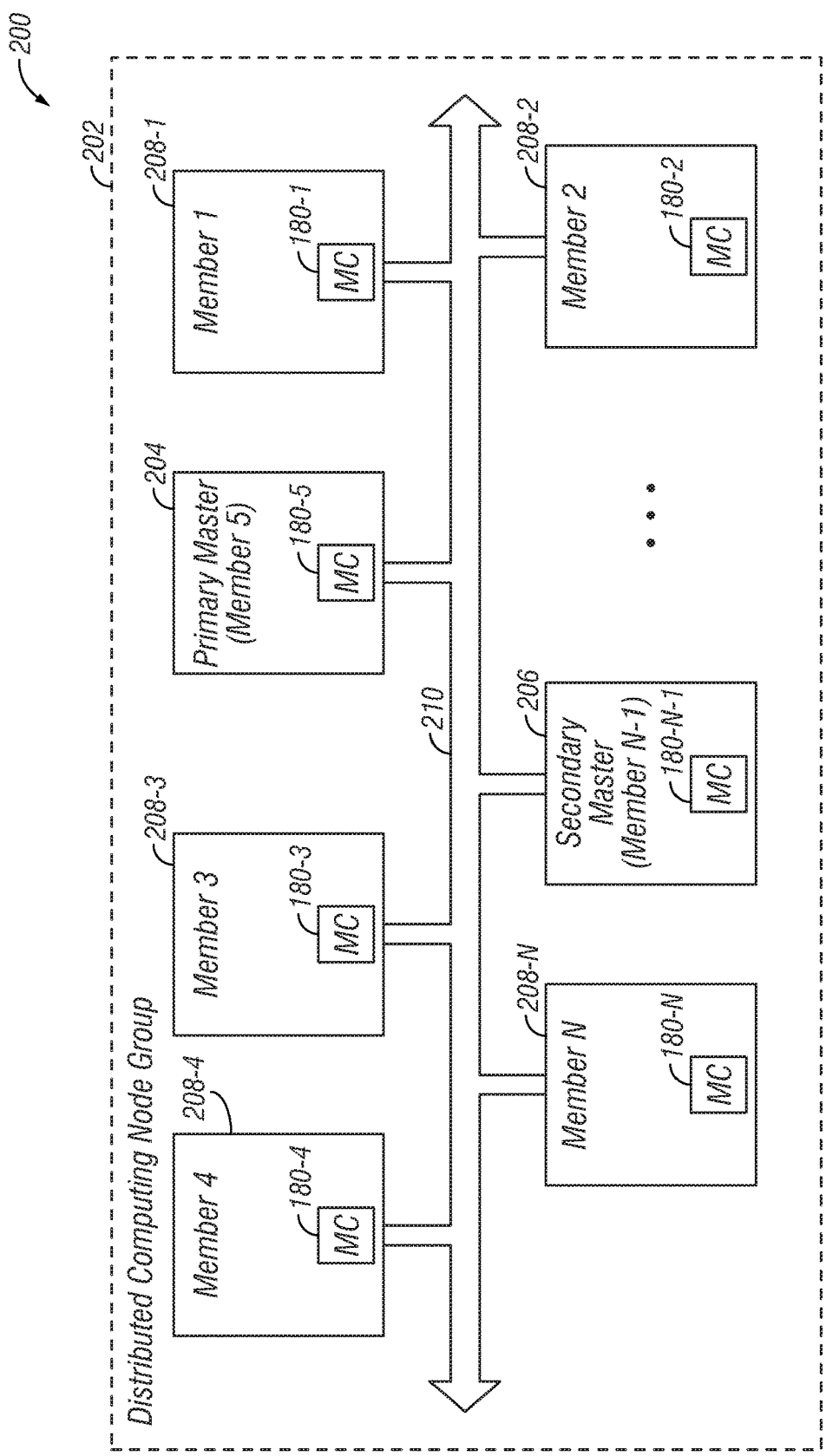
FIG. 2 is a block diagram of selected elements of a distributed computing node group, in accordance with some embodiments of the present disclosure.

Referring now to FIG. 2, a block diagram of selected elements of a distributed computing node group 202 is shown in accordance with some embodiments of the present disclosure. A plurality of information handling systems 200 may be grouped together to form a distributed computing node group 202, in which each node or member 208 in node group 202 may correspond to an information handling system, which may include a management controller 180.

Group 202 may include a plurality of members 208 connected together with a messaging channel 210. Members 208 may use messaging channel 210 to send and receive messages to each other. The messages may be unencrypted, encrypted, signed, or unsigned. Messaging channel 210 may include any suitable interface between management controllers, including but not limited to a network interface, such as Ethernet, and an I/O interface, such as PCI-E. Management controllers 180 in group 202 may communicate using messaging channel 210 to perform a refresh of an information handling system using many to one peer-based communication.

Group 202 may also include a master, such as a primary master 204 and/or a secondary master 206. The master may control and/or manage group 202. Control of group 202 may include the addition and/or removal of members from group 202. Management of group 202 may include refreshing one or more members of group 202. Although addition, removal, and refresh are described, the master may perform any operation sufficient to control or manage a distributed computing node group 202. In one embodiment, the primary master may be selected at random. In another embodiment, the primary master may be selected using the timestamp of entry into the group, in which the most recent member to join the group or the least recent member to join the group is elected the primary master. The secondary master 206 may serve as the master when the primary master is offline or unavailable. The election or selection of the secondary master 206 may be performed in a similar manner as the primary master.

Figure 3:
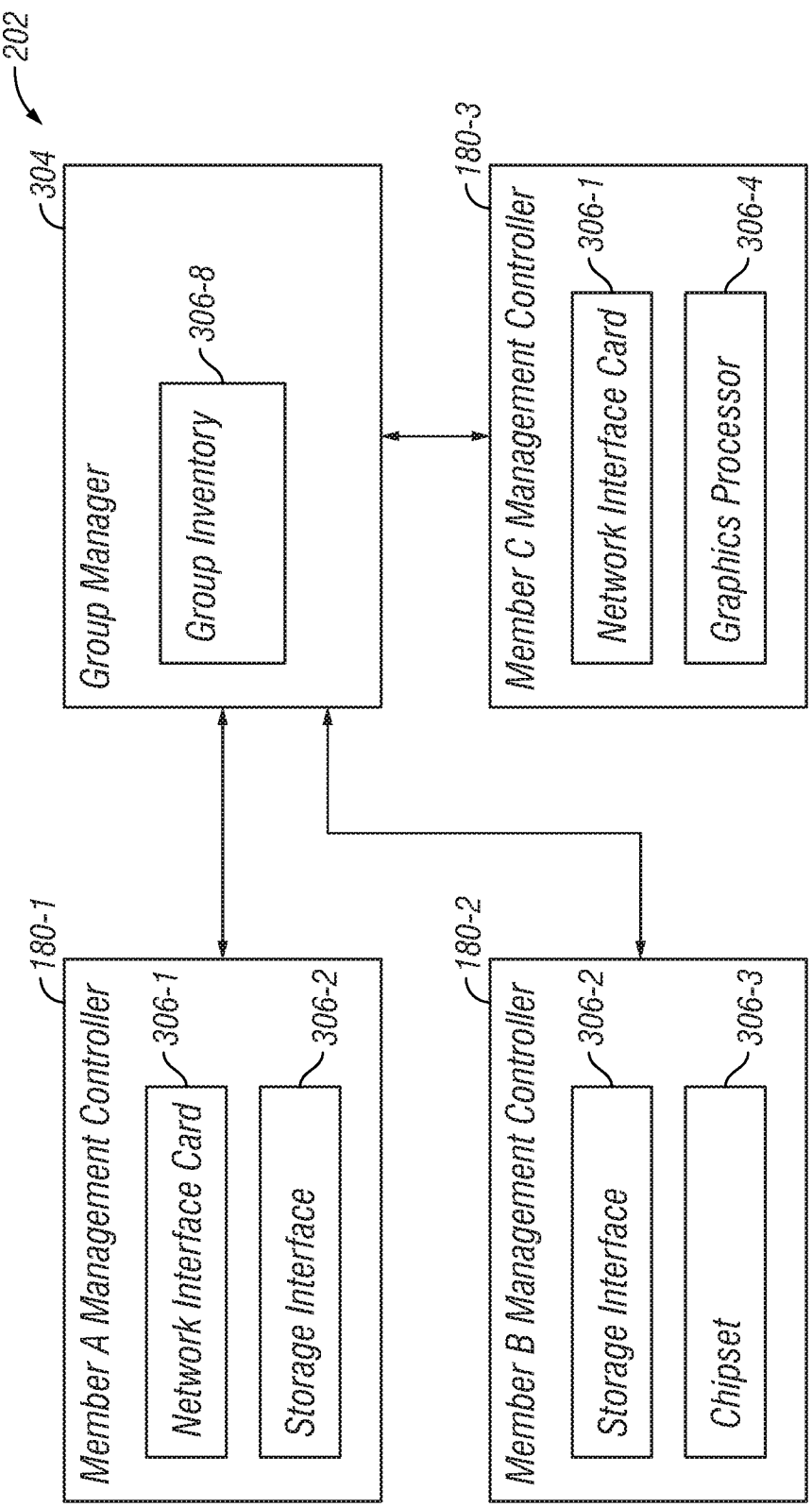
FIG. 3 is a block diagram of selected elements of a group manager with support for refresh using many to one communication, in accordance with some embodiments the present disclosure.

Referring now to FIG. 3, a block diagram of selected elements of a group manager with support for refresh using many to one communication is shown in accordance with some embodiments the present disclosure. The distributed computing node group 202 for refreshing an information handling system may include a plurality of members. Each member may include a member management controller 180. Each management controller may have access to one or more devices 306 to configure. Devices 306 may correspond to any suitable component of an information handling system, including but not limited to a network interface, a graphics processor, and/or a storage resource. Devices 306 may include any suitable type of configuration, including but not limited to a firmware, driver, and/or configuration file.

Group manager 304 may communicate with each member management controller 180 to create group inventory 308. Group manager 304 may correspond to primary master 204 or secondary master 206. In one embodiment, group manager 304 may be a member management controller 180. Group manager management controller 304 may also populate group inventory 308 with its own inventory. In one embodiment, the group manager may actively maintain the group inventory by querying each of the member management controllers for updates on a periodic basis, such as once per hour or day. In another embodiment, member management controllers 180 may push updates to the group manager 304 when available to inventory. For example, member management controller 180-1 may send the firmware or a link to the firmware for device 306-1 to group manager 304. Member management controller 180-1 may initiate the communication after it receives or downloads the firmware. In a further embodiment, the group manager may only update the group inventory when a new or updated device configuration is received. The device configuration may be the configuration file itself, or a link to the configuration file located on a member management controller.

As an example, the group inventory 308 may include devices 306-1, 306-2, 306-3, and 306-4. Device 306-1 may correspond to a network interface card, in which the configuration information may be a driver and/or firmware. Device 306-2 may correspond to a storage interface, in which the configuration information may be a driver, firmware, and/or configuration file. Device 306-3 may correspond to a chipset or I/O subsystem, in which the configuration information may be a driver and/or configuration file. Device 306-4 may correspond to a graphics processor, in which the configuration information may be a driver, firmware, and/or configuration file.

Management controller 180-1 may request a driver for device 306-1 from the group manager 304. Group manager 304 may attempt to search group inventory 308 for a matching entry. In one embodiment if no match is found, group manager 304 may note the failure to find a match and proceed to the next request. In another embodiment, if no match is found, group manager 304 may distribute a request for the driver of device 306-1 to the group. Group manager 304 may communicate with other member management controllers 180 to obtain group information for group inventory 308 using a many to one peer-based interface, which may include a broadcast or multicast message. One or more member management controllers 180 may respond to the request for information. For example, member management controller 180-3 may respond to a request for a driver of device 306-1. Group manager 304 may then insert information from the response into group inventory 308 and respond to member management controller 180-1 with the information about the driver. In one embodiment, the information inserted may include an identifier for the device mapped to the file or a link to the file. In another embodiment, the information inserted may include an identifier for the device, a version of the configuration, and a file or a link to the file. Although each member management controller is shown with two devices, a management controller or the corresponding information handling system may contain any number of devices suitable for refresh.

As described above, group manager 304 may attempt to search group inventory 308 during a refresh of an information handling system. The search may yield a best matching result. A best match may consist of a multi-phase search, in which a different term is used to search in each phase. For example, the first phase may be to search for the Peripheral Component Interconnect Express (PCI-E) identifier for a device installed on the information handling system being refreshed. The PCI-E identifier may include a device identifier, a vendor identifier, a sub device identifier, and/or a sub vendor identifier. If the PCI-E identifier does not match, the second phase may be to search for a reseller component identifier, which may represent a validated component in the system. As another example, the first phase may be to search for a particular version of firmware or driver. If no match is found, the second phase may be to search for a matching model number for the information handling system. If still no match is found, a third phase may be to search for another model or a similar model. The multi-phase approach may also include ordering or sorting the group inventory 308 such that the newest or latest version of configuration may be matched before an older or earlier version.

The group manager 304 may include one or more policies to override any requests from a management controller. This policy, also known as a group policy, may enable the group manager to require a specific version of the configuration. For example, the group policy may require an older, more stable version of a device driver. A member management controller 180 requesting information corresponding to the configuration of a device may receive the older version of the device driver, rather than the newest or latest version.

Figure 4:
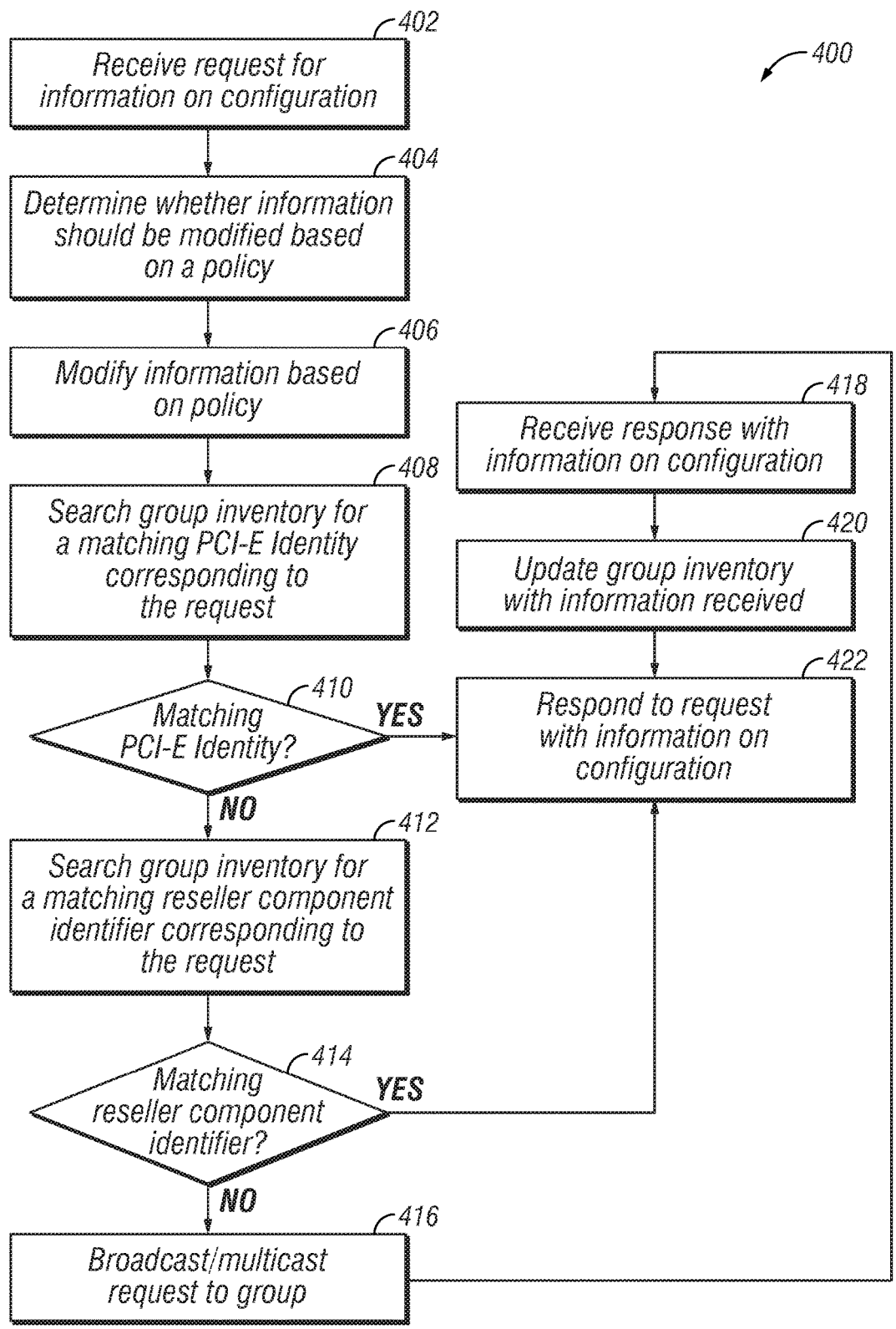
FIG. 4 is a flow chart depicting selected elements of a method for refreshing an information handling system using many to one communication, in accordance with some embodiments the present disclosure.

Referring now to FIG. 4, a flow chart depicting selected elements of a method for managing distributed groups is shown in accordance with some embodiments the present disclosure. Method 400 may be implemented by any of the elements shown in FIGS. 1-3. Method 400 may be initiated by any suitable criteria and may initiate operation at any suitable point. In one embodiment, method 400 may initiate operation at 402. Method 400 may include greater or fewer steps than those illustrated. Moreover, method 400 may execute its steps in an order that is different than those illustrated below. Method 400 may terminate at any suitable step. Moreover, method 400 may repeat operation at any suitable step. Portions of method 400 may be performed in parallel and repeat with respect to other portions of method 400.

At 402, a request for information on a configuration may be received at the group manager 304 from a member management controller 180, which may be performing a refresh of an information handling system. In one embodiment, the request may specify a device installed on the information handling system, may provide a desired version for the device, and may provide the type of configuration desired. The request for the device installed on the information handling system may include a PCI-E identifier for the device and/or include a reseller component identifier. For example, a request may specify a graphics card as the device with a particular version of a driver. The request for the graphics card may include a PCI-E identifier for the graphics card and may include a reseller component identifier. In another embodiment, the request may specify a new information handling system, which may include an information handling system identifier or an information handling system reseller identifier, a version or generation for the information handling system, and/or the type of configuration for the information handling system. Although three parts to the request are described, any number of parts may be specified sufficient to enable the group manager to search for or locate the requested information. At 404, it may be determined whether the information in the request should be modified based on a policy. A policy may enable the group manager to enforce a group policy such that the distributed computing node group 202 may use a particular version for the configuration of a device. The policy may enable the enforcement of using configurations that are previously verified to operate properly. For example, if version 2.1 of a network card's firmware has been verified and inserted into the policy, group manager 304 may modify a request for version 2.2 of the network card's firmware to request version 2.1. At 406, the information in the request may be modified based on the policy.

At 408 in one embodiment, group manager 304 may search the group inventory 308 for a Peripheral Component Interconnect Express (PCI-E) identifier matching the PCI-E identifier in the request. The PCI-E identifier may include a device identity, a vendor identity, a sub device identity, and/or a sub vendor identity. In another embodiment, group manager 304 may search the group inventory 308 for a unique identifier in the request. The unique identifier may correspond to a device that does not use or support a PCI-E interface, which may correspond to a device without a PCI-E identifier. At 410, it may be determined whether a matching identity is found. If found, method 400 may proceed to method step 422. If not found, method 400 may proceed to method step 412. At 412, the group manager may search the group inventory for a reseller component identifier matching the reseller component identifier specified in the request. The reseller component identifier may represent an identifier assigned to components verified by a reseller. Although the term reseller is used, any suitable verification entity may define the identifier, including but not limited to an original equipment manufacturer (OEM) and an original design manufacturer (ODM). At 414, it may be determined whether a matching reseller component identifier is found. If found, method 400 may proceed to method step 422. If not found, method 400 may proceed to method step 416. At 416, the group manager may broadcast or multicast a request to the group to locate the information corresponding to the configuration. This request may be sent using messaging channel 210.

At 418, group manager 304 may receive a response to its request to locate with information corresponding to the configuration. Group manager 304 may also receive multiple responses to its request from multiple nodes in the group using many to one peer-based communication. At 420, group manager 304 may update the group inventory with the information received, which may avoid a future request to the group. At 422, group manager 304 may respond to the request with information on the configuration. This information may be sourced from the group inventory or a request to the group.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for refreshing an information handling system, comprising:
 receiving, at a group manager, a request for information corresponding to a configuration, wherein the request is received from a node in a group with a plurality of nodes and the information requested corresponds to an update to the configuration of the node;
 searching a group inventory for the information, wherein the group inventory:
  is sourced from nodes of the plurality of nodes in the group;

contains a plurality of entries wherein each entry corresponds to a device in one or more nodes of the group; and
is maintained by the group manager; and
responding to the request with the information corresponding to the configuration based on finding a match in the group inventory.

2. The method of claim 1, further comprising:
determining that no match was found during the search;
distributing a request to the group to locate the information requested;
receiving, using many to one peer-based communication, at least one response to the request with the information corresponding to the configuration; and
inserting the information received into the group inventory, wherein the match found in the group inventory corresponds to the information received.

3. The method of claim 1, further comprising modifying the information requested based on a policy, wherein the policy specifies a particular version of the configuration and replaces a version in the request with the particular version specified by the policy.

4. The method of claim 1, wherein searching a group inventory for the information comprises searching for at least one of:
a Peripheral Component Interconnect Express (PCI-E) identifier sourced from the request; and
a reseller component identifier sourced from the request.

5. The method in claim 1, wherein the information in the response is a link to a file.

6. The method in claim 1, wherein the information requested comprises at least one of:
a firmware;
a driver; and
a configuration setting.

7. An information handling system, comprising:
a processor subsystem having access to a first memory;
a management controller comprising a secondary processor having access to a second memory, the second memory including an embedded storage partition and the second memory storing instructions executable by the secondary processor to:
receive, at a group manager, a request for information corresponding to a configuration, wherein the request is received from a node in a group with a plurality of nodes and the information requested corresponds to an update to the configuration of the node;
search a group inventory for the information, wherein the group inventory:
is sourced from nodes of the plurality of nodes in the group;
contains a plurality of entries wherein each entry corresponds to a device in one or more nodes of the group; and
is maintained by the group manager; and
respond to the request with the information corresponding to the configuration based on a match in the group inventory.

8. The information handling system of claim 7, further comprising instructions executable by the secondary processor to:
determine that no match was found during the search;
distribute a request to the group to locate the information requested;
receive, using many to one peer-based communication, at least one response to the request with the information corresponding to the configuration; and
insert the information received into the group inventory, wherein the match found in the group inventory corresponding to the information received.

9. The information handling system of claim 7, further comprising instructions executable by the secondary processor to modify the information requested based on a policy, wherein the policy specifies a particular version of the configuration and replaces a version in the request with the particular version specified by the policy.

10. The information handling system of claim 7, wherein the instructions to search the group inventory further comprise instructions executable by the secondary processor to search for at least one of:
a Peripheral Component Interconnect Express (PCI-E) identifier sourced from the request; and
a reseller component identifier sourced from the request.

11. The information handling system of claim 7, wherein the information in the response is a link to a file.

12. The information handling system of claim 7, wherein the information requested comprises at least one of:
a firmware;
a driver; and
a configuration setting.

13. The information handling system of claim 7, wherein the instructions for the group inventory further comprise instructions to sort the group inventory to match a latest version of the configuration.

14. A management controller for an information handling system having a primary processor and a primary memory, the management controller comprising a secondary processor having access to a secondary memory, the secondary memory including an embedded storage partition and the secondary memory storing instructions executable by the secondary processor to:
receive, at a group manager, a request for information corresponding to a configuration, wherein the request is received from a node in a group with a plurality of nodes and the information requested corresponds to an update to the configuration of the node;
search a group inventory for the information, wherein the group inventory:
is sourced from nodes of the plurality of nodes in the group;
contains a plurality of entries wherein each entry corresponds to a device in one or more nodes of the group; and
is maintained by the group manager; and
respond to the request with the information corresponding to the configuration based on a match in the group inventory.

15. The management controller of claim 14, further comprising instructions executable by the secondary processor to:
determine that no match was found during the search;
distribute a request to the group to locate the information requested;
receive, using many to one peer-based communication, at least one response to the request with the information corresponding to the configuration; and
insert the information received into the group inventory, wherein the match found in the group inventory corresponding to the information received.

16. The management controller of claim 14, further comprising instructions executable by the secondary processor to modify the information requested based on a policy, wherein the policy specifies a particular version of the configuration and replaces a version in the request with the particular version of the configuration.

17. The management controller of claim 14, wherein the instructions to search the group inventory further comprise instructions executable by the secondary processor to search for at least one of:
   a Peripheral Component Interconnect Express (PCI-E) identifier sourced from the request; and
   a reseller component identifier sourced from the request.

18. The management controller of claim 14, wherein the information in the response is a link to a file.

19. The management controller of claim 14, wherein the information requested comprises at least one of:
   a firmware;
   a driver; and
   a configuration setting.

20. The management controller of claim 14, wherein the instructions for the group inventory further comprise instructions to sort the group inventory to match a latest version of the configuration.

\* \* \* \* \*